United States Patent
Reiche et al.

(10) Patent No.: US 10,349,250 B2
(45) Date of Patent: Jul. 9, 2019

(54) SYSTEM AND METHOD FOR CREATING PHYSICAL OBJECTS USED WITH VIDEOGAMES

(71) Applicant: Activision Publishing, Inc., Santa Monica, CA (US)

(72) Inventors: Paul Reiche, Novato, CA (US); Robert Leyland, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 441 days.

(21) Appl. No.: 14/862,976

(22) Filed: Sep. 23, 2015

(65) Prior Publication Data

US 2017/0080333 A1    Mar. 23, 2017

(51) Int. Cl.
| | |
|---|---|
| *A63F 13/40* | (2014.01) |
| *H04W 4/80* | (2018.01) |
| *A63F 13/25* | (2014.01) |
| *A63F 13/355* | (2014.01) |
| *A63F 13/95* | (2014.01) |
| *B33Y 80/00* | (2015.01) |
| *B33Y 10/00* | (2015.01) |

(52) U.S. Cl.
CPC ............... *H04W 4/80* (2018.02); *A63F 13/25* (2014.09); *A63F 13/355* (2014.09); *A63F 13/95* (2014.09); *B33Y 10/00* (2014.12); *B33Y 80/00* (2014.12)

(58) Field of Classification Search
CPC ........ A63F 13/25; A63F 13/355; A63F 13/95; B33Y 10/00; B33Y 80/00
USPC .......................................................... 463/42
See application file for complete search history.

(56) References Cited

U.S. PATENT DOCUMENTS

| | | | | |
|---|---|---|---|---|
| 5,707,288 | A * | 1/1998 | Stephens | A63F 13/00 345/418 |
| 7,081,033 | B1 * | 7/2006 | Mawle | A63F 13/02 446/175 |
| 7,656,402 | B2 * | 2/2010 | Abraham | G06Q 30/06 345/419 |
| 2003/0064812 | A1 * | 4/2003 | Rappaport | A63F 13/10 463/43 |
| 2004/0092311 | A1 * | 5/2004 | Weston | A63F 13/10 463/42 |
| 2005/0182693 | A1 * | 8/2005 | Alivandi | A63F 13/12 705/26.5 |

(Continued)

*Primary Examiner* — Omkar A Deodhar
*Assistant Examiner* — Shauna-Kay Hall
(74) *Attorney, Agent, or Firm* — Klein, O'Neill & Singh, LLP

(57) ABSTRACT

A user may create a customized virtual game character and the customized virtual game character may be physically substantiated. In some embodiments the virtual game character is physically substantiated by printing a representation of the virtual game character on a card, which in some embodiments has computer readable information regarding the virtual game character. In some embodiments the virtual game character is physically substantiated by making a toy in the form of the virtual game character, which in some embodiments has computer readable information regarding the virtual game character. In some embodiments the toy is made by way of 3-D printing, with for example character information uploaded from a user's game machine to a 3-D printing facility, which may also receive additional detailed information about parts of the character from a third party server.

7 Claims, 10 Drawing Sheets

(56) References Cited

U.S. PATENT DOCUMENTS

| | | | |
|---|---|---|---|
| 2006/0054679 A1* | 3/2006 | Ruping | A63F 13/00 235/375 |
| 2008/0111816 A1* | 5/2008 | Abraham | G06Q 30/06 345/420 |
| 2011/0098092 A1* | 4/2011 | Reiche, III | A63F 13/65 463/1 |
| 2013/0196766 A1* | 8/2013 | Leyland | A63F 9/24 463/36 |
| 2015/0087427 A1* | 3/2015 | Wane | A63F 13/213 463/43 |
| 2015/0187134 A1* | 7/2015 | Baecher | G06T 17/10 345/420 |

* cited by examiner

SYSTEM AND METHOD FOR CREATING PHYSICAL OBJECTS USED WITH VIDEOGAMES

BACKGROUND OF THE INVENTION

The present invention relates generally to the creation and customization of videogame objects and to the physical substantiation of those videogame objects.

Videogames are enjoyed by many people. Videogames allow videogame players to participate in a variety of simulated activities. They also allow videogame players to perform roles and experience activities that the game players may not be able or desire to experience directly, whether due to cost, danger, or equipment concerns, or simply due to a role or activity being a fantasy.

Because videogames are generally provided by way of an electronic device (e.g., a game console) and a display (e.g., a television screen), they often lack a physical component by which videogame players may physically interact with the videogame's virtual world and the virtual objects within. Despite the audiovisual improvements achieved by videogames in recent times, game play experience largely remains two dimensional. Merely interacting with a displayed simulated environment may not allow videogame players to fully relate or connect to game play, with a sharply distinct separation between a virtual world and the world physically inhabited by the videogame players.

Some videogames make use of pre-packaged toys that may be representative of videogame objects (e.g., characters, items, weapons, vehicles, buildings, etc.), adding a "real-world" element to videogame play. However, players may not be able to easily modify such pre-packaged toys to reflect in-game customizations made to their corresponding objects. In addition, videogames may allow players to create their own custom objects, but players may not be able to readily bring these custom virtual objects into the real world.

BRIEF SUMMARY OF THE INVENTION

One aspect of the invention provides a method for creating and using a physical representation of a videogame object, comprising: receiving selections of videogame object physical attributes from a game device; substantiating the videogame object in a physical object; and providing for videogame play which includes game player control of the videogame object.

Another aspect of the invention provides a method useful for videogame play, comprising: customizing a game object using a game device; determining whether an order is placed for a toy associated with the customized game object; if the order is placed for the toy associated with the customized game object, creating the toy associated with the customized game object; determining whether communication with the toy is successful; if the communication with the toy is successful, displaying a representation of the customized game object associated with the toy; and conducting gameplay involving the representation of the customized game object.

Another aspect of the invention provides a method useful for videogame play involving videogame object customization, comprising: determining whether to customize a videogame object; if a videogame object is to be customized, creating a customized videogame object; creating a game card having information of the customized videogame object; retrieving the information of the customized videogame object from the game card; displaying a representation of the customized videogame object based on the information of the customized videogame object received from the game card; and providing videogame play using the representation of the customized videogame object.

Another aspect of the invention provides a method for creating and using a physical representation of a videogame character, comprising: receiving selections of videogame character physical attributes from a game device; substantiating the videogame character in a physical object; storing information relating to the videogame character in a creation vessel; and providing for videogame play which includes game player control of the videogame character.

Another aspect of the invention provides a method useful for videogame play, comprising: customizing a game character using a game device; storing information relating to the game character in a creation vessel; determining whether an order is placed for a toy associated with the customized game character; if the order is placed for the toy associated with the customized game character, creating the toy associated with the customized game character; determining whether communication with the toy is successful; if the communication with the toy is successful, displaying a representation of the customized game character associated with the toy; and conducting gameplay involving the representation of the customized game character.

Another aspect of the invention provides a method useful for videogame play involving videogame character customization, comprising: determining whether to customize a videogame character; if a videogame character is to be customized, creating a customized videogame character; creating a game card having information of the customized videogame character; retrieving the information of the customized videogame character from the game card; displaying a representation of the customized videogame character based on the information of the customized videogame character received from the game card; and providing play of the videogame using the representation of the customized videogame character.

Another aspect of the invention provides a method of substantiating a videogame character, comprising: receiving information, over a network, of a videogame character from a game device, the information of the videogame character including information relating to the videogame character; transmitting over the network to a server at least some of the information relating to the videogame character; receiving over the network from the server information of physical attributes of the videogame character; and printing a three dimensional form of the videogame character using the information of the physical attributes of the videogame character.

These and other aspects of the invention are more fully comprehended upon review of this disclosure.

DETAILED DESCRIPTION

Figure 1:
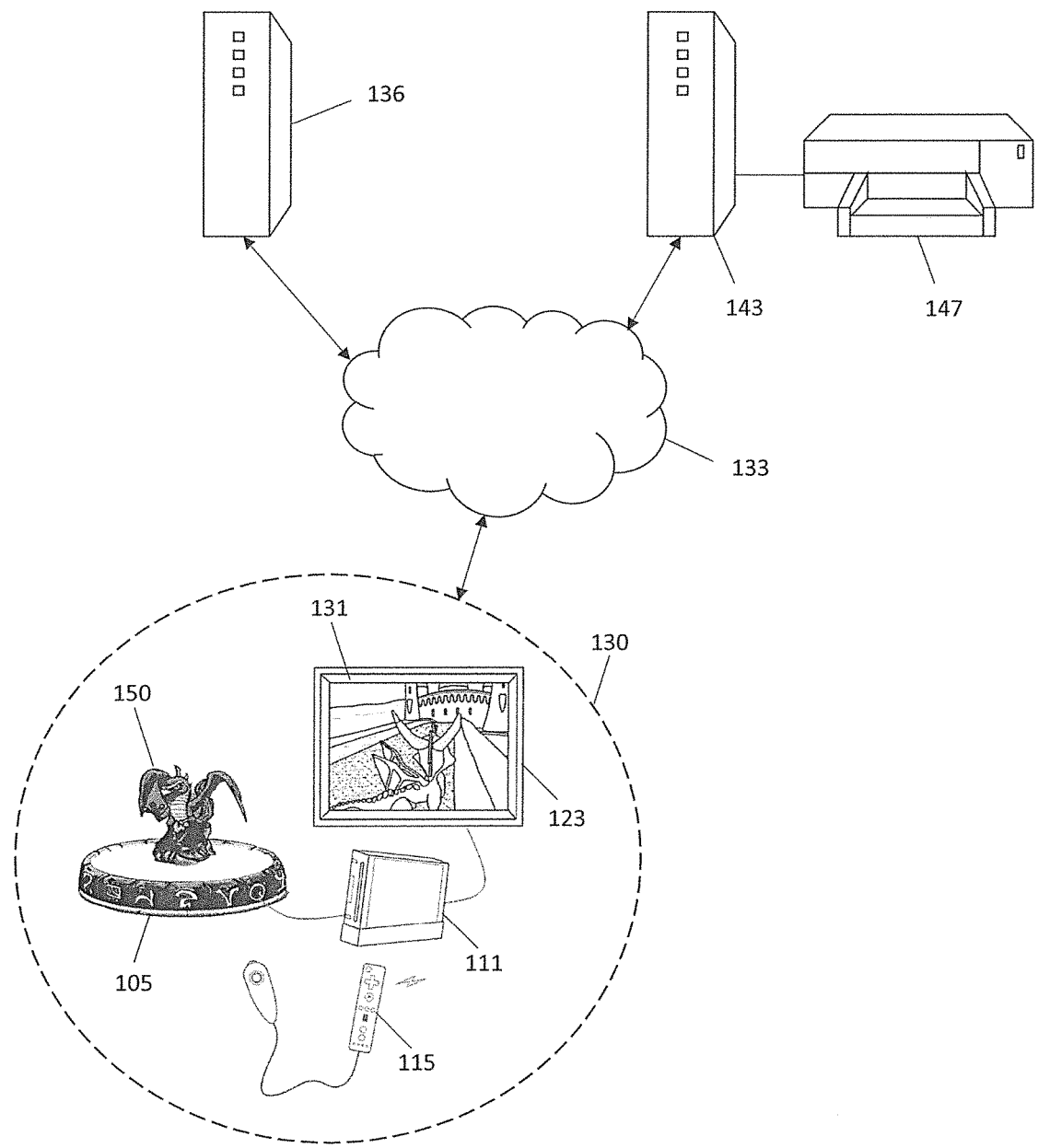
FIG. 1 is semi-block diagram of a system in accordance with aspects of the invention.

Aspects of the invention relate to providing a physical representation or "substantiation" of an in-game virtual object for a videogame, the virtual object being generated by a game player using a game device. As used herein, the term "in-game object" (alternatively, "videogame object," "game object," or "object") includes any in-game element of a videogame, including for example characters, items, weapons, vehicles, buildings, environmental elements, and the like. In some embodiments, the game object is a videogame character controlled by a game play during play of a videogame. In some embodiments, a game player may create a game object for use in a videogame, for example through the selection of choices for a plurality of options relating to aspects of the game object. In such embodiments, the game device may present the user with choices for selection for each of a plurality of options, with the game receiving the selections and storing the selections as defining the game object. The options may relate to visual attributes of the game object, for example, shape, size, and other physical features of the game object, as well as ornamentation (e.g., clothing, jewelry, paint jobs, skins, decorations, etc.) for the game object. The options may also relate to non-visual attributes of the game object, for example the game object's name, catch phrase, class, element type, hit points, stamina, strength, agility, intelligence, speed, durability, spells, capabilities, and powers within play of the videogame. The selections, therefore, may define the visual and non-visual attributes of the game object. The visual attributes of the game object may define some and/or all aspects of a two- and/or three-dimensional representation of the game object.

In some embodiments, the videogame will present to the game player only a subset of possible choices and options for creating and customizing a game object, with other choices and options being made available only after certain conditions have been met. New options and choices may be made available to the game player in a number of ways, including without limitation, based on the game player's progress and achievements within game play, based on the physical toys obtained by the game player and used within the videogame, or based on events defined by the videogame manufacturer (or publisher or distributor). Game players may also purchase access to new options, either through a digital transaction, a physical intermediary such as a gift card for digital transactions, or a physical purchase such as a toy, card or other item. In some embodiments, the player may not know exactly which option(s) he has acquired until he has paid for it and/or redeemed it within the game.

According to aspects of the invention, information relating to the game object may be stored in a physical object (herein referred to as a "creation vessel"). The creation vessel is a data container and may, for example, be a trading card, toy, memory device, or any other physical object having a machine-readable/writeable storage component, examples of which include radio-frequency identification (RFID) tags, near-field communication (NFC) tags, flash memory drives, solid-state memory drives, and the like. In some embodiments, the creation vessel does not resemble the game object being stored. For example, the creation vessel may be a generic toy (e.g., treasure chest, gem, stone, trinket, etc.), trading card, or other physical object, and may be used to store information relating to a variety of virtual game objects that do not resemble the creation vessel (e.g., characters, vehicles, items, weapons, buildings, etc.).

In some embodiments, the creation vessel may comprise a unique identifier stored, for example, in the machine-readable/writeable storage component previously discussed or in a separate machine-readable storage component of the creation vessel, for example an optically-readable storage component (e.g., a barcode, QR code, digital watermark, alphanumeric code, etc.). In cases where the creation vessel comprises a unique identifier, the game object may be linked with the creation vessel by associating the creation vessel's unique identifier with information relating to the game object, and storing said association (along with both the unique identifier and game object information) in the game device and/or a server. The stored information may, in some embodiments, be accessed across multiple platforms (e.g., different game consoles, game devices, and computer devices) and applications (e.g., videogames, companion apps, online stores, social media applications, websites, etc.).

In some embodiments, the creation vessel may comprise one or more portions allowing for the game players to physically customize the creation vessel. For example, a trading card-based creation vessel may comprise a blank area on one side of the card allowing game players to write phrases, draw pictures, or add stickers relating to their game object. In such embodiments, the game device may optically recognize a player's physical customizations and/or the creation vessel's unique identifier and use the recognized data within game play. For example, upon recognizing the player's physical customizations and/or the creation vessel's unique identifier, the game device may present the game object associated with the creation vessel in the game.

According to aspects of the invention, the game device may also communicate information relating to the game object to a physical substantiation device. The physical substantiation device may be directly coupled to the game device or indirectly coupled through one or more devices on a computer network. The physical substantiation device is capable of creating a physical substantiation of, or relating to, the game object. For example, the physical substantiation device may be a "traditional" or 2-D printer device for printing an image of, or relating to, the game object on paper products (e.g., trading cards, greeting cards, stock paper, stickers/labels, etc.), CDs, and the like. Additionally or alternatively, the physical substantiation device may be 3-D printer device, for example a printer that lays down successive layers of material to create a physical object. The 3-D printer may form a physical object or toy that resembles or relates to the game object, though in some embodiments, the physical object may be generic and not representative of the game object (e.g., a treasure chest, gem, stone, trinket, etc.). Other devices or processes may be used to physically substantiate the game object, for example known toy molding and manufacturing processes, clothing and textile manufacturing processes, plush toy manufacturing processes, etc. In some cases, the physical substantiation of the game object may include or reflect non-visual attributes of the game object (e.g., a trading card may include a description or listing of the game object's non-visual attributes).

In some embodiments, the physical substantiation of the game object comprises a machine-readable/writeable storage component. In such embodiments, the game device or physical substantiation device may write information relating to the game object to the machine-readable/writeable storage component. In some embodiments, the physical substantiation of the game object may include a cavity, recess, cutout, or other volume to receive the machine-readable/writeable storage component.

According to aspects of the invention, the information relating to the game object may include any information relevant to the game object, including for example, a unique identifier associated with the game object, a unique identifier associated with a creation vessel storing information relating to the game object, and information relating to the game object's attributes. In some embodiments, the information relating to the game object is sufficient to define all aspects of the game object. Alternatively, the information relating to the game object may only be sufficient to define one or more portions of the game object, with information relating to the undefined portions coming from a separate source.

According to aspects of the invention, both the creation vessel associated with the game object (and/or storing information relating to the game object) and the physical substantiation of the game object may be used for videogame play. For example, upon detecting a physical substantiation of the game object (e.g., a trading card and/or toy embodying the game object), the game device can read information relating to the game object stored in the physical substantiation's storage component and use that information to provide for videogame play including the game object. As another example, upon detecting a creation vessel, the game device can read the creation vessel's unique identifier, retrieve information relating to the game object previously associated with the creation vessel's unique identifier, and use that information to provide for videogame play including the game object.

FIG. 1 illustrates an embodiment of a system in accordance with aspects of the invention. The system includes a videogame system 130. The videogame system may be coupled to a network 133, which may be for example the Internet. Also coupled to the network are a first server 136 (or a plurality of servers) and a second server 143. As shown in FIG. 1, a physical substantiation device 147 is coupled to the second server, either directly or through a local wired or wireless network, though in some embodiments the physical substantiation device made be directly coupled to game device 111. The physical substantiation device may be a traditional 2-D printer, for example for printing text and/or images on paper or similar stock, a 3-D printer, for example for creating physical objects through laying down successive layers of material to create an object or structure, or any other device or process suitable for producing physical substantiations of the game object.

The videogame system includes a game device. In FIG. 1 the game device is shown as game console 111. In various embodiments the game device may instead be another computer device, for example a tablet computer, a smartphone, a laptop computer, a personal computer, smart television, or any other computer device suitable for playing videogames. The game console has a processor and associated circuitry for executing program instructions for providing game play and, as discussed herein, for creating game objects and, in some embodiments, for commanding physical substantiation of game objects. The instructions providing for game play may be stored on removable media, for example, an optical disk, or may be stored on the game console's non-removable storage. Accordingly, the game device may include an optical drive, for example, a DVD-ROM, CD-ROM, Blu-ray drive, or hard drive for reading the instructions for game play. Also as illustrated in FIG. 1, the videogame system includes user input devices such as a game controller 115, a display device 123 for displaying game action, and a peripheral device 105, which includes circuitry for reading information from, and in some embodiments writing information to, another object. A toy 150, which in various embodiments includes a rewritable memory, is shown as placed upon the peripheral device, for example so that the peripheral information may read information of the toy. In the embodiment of FIG. 1, the toy physically resembles a videogame character created by a game player.

In some embodiments, the game device may provide for game play by presenting a videogame object in a virtual world. Control of the videogame object in the virtual world may be based on user inputs, for example, provided by the game controller. For example, the processor, responsive to inputs from the user input devices and the peripheral device 105, generally commands display on the display device 123 of a game object in and interacting with a virtual world of game play and possibly each other. In addition, the processor, responsive to inputs from the peripheral device 105, for example inputs based on information read from the physical object or toy, may be used to add objects, for example the game character represented by the physical object or toy, to the virtual world, with the character able to move about the virtual world.

The display device 123 is generally coupled to the game device by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. In yet other embodiments, the display device may be integrated with the game device (e.g., a tablet, smartphone, or smart television). A display screen 131 of the display device 123 displays video images of game play, generally as commanded by the processor or other associated circuitry of the gaming platform. In the embodiment of FIG. 1, the display screen shows a screenshot of game play. As illustrated, the screenshot shows a display of a game character, for example a game character represented by the toy 150, generally controlled by and animated in accordance with user inputs.

In addition, the game device allows a game player to create or customize a game object for use in the videogame, for example through selection of choices for a plurality of options relating to aspects of the game object. The game device may present the user choices for selection for each of a plurality of options, with the game receiving the selections and storing the selections as defining the game object. The options may relate to visual attributes of the game object, for example, shape, size, and other physical features of the game object, as well as ornamentation (e.g., clothing, jewelry, paint jobs, skins, decorations, etc.) for the game object. The options may in addition also relate to non-visual attributes of the game object, for example the game object's name, catch phrase, class, element type, hit points, stamina, strength, agility, intelligence, speed, durability, spells, capabilities, and powers within play of the videogame. The selections, therefore, may define the visual and non-visual attributes of the game object.

In some embodiments the game device may enable or allow the game player to select a predefined game object, for example through selection of choices for a plurality of predefined game objects, with each of the plurality of predefined game objects having predefined visual and/or non-visual attributes, but, in some embodiments, still allowing for further customizations by the game player.

In some embodiments, information relating to the game object may be stored in a creation vessel (not shown) as described above. The creation vessel may, for example, be a trading card, toy, memory device, or any other physical object having a machine-readable/writeable storage component, examples of which include radio-frequency identification (RFID) tags, near-field communication (NFC) tags, flash memory drives, solid-state memory drives, and the like. As discussed above, the creation vessel maybe "generic" in the sense that it does not necessarily resemble the game object being stored.

In some embodiments, the creation vessel may comprise a unique identifier stored, for example, in the machine-readable/writeable storage component or in a separate machine-readable storage component of the creation vessel, for example an optically-readable storage component (e.g., a barcode, QR code, digital watermark, alphanumeric code, etc.). In cases where the creation vessel comprises a unique identifier, the game object can be linked with the creation vessel by associating the creation vessel's unique identifier with information relating to the game object in the game device and/or a server.

The game device may also communicate information relating to the game object to physical substantiation device 147. The physical substantiation device may be directly coupled to the game device or indirectly coupled through a computer network (e.g., the internet). The physical substantiation device is capable of creating a physical substantiation of, or relating to, the game object. For example, the physical substantiation device may be a "traditional" or 2-D printer device for printing an image of, or relating to, the game object on paper products (e.g., trading cards, greeting cards, stock paper, stickers/labels, etc.), clothing, CDs, and the like. Additionally or alternatively, the physical substantiation device may be 3-D printer device, for example a printer that lays down successive layers of material to create a physical object. Non-limiting examples of 3-D printing processes include stereolithography, digital light processing, laser sintering, selective deposition lamination, inkjet, and extrusion. The 3-D printer may form a physical object or toy that resembles or relates to the game object. Other devices or processes may be used to physically substantiate the game object, for example known toy molding and manufacturing processes. In some cases, the physical substantiation of the game object may include or reflect non-visual attributes of the game object (e.g., a trading card may include a description or listing of the game object's non-visual attributes).

In some embodiments, the physical substantiation of the game object comprises a machine-readable/writeable storage component, examples of which include radio-frequency identification (RFID) tags, near-field communication (NFC) tags, flash memory drives, solid-state memory drives, and the like. In such embodiments, the game device or physical substantiation device may write information relating to the game object to the machine-readable/writeable storage component. In some embodiments, the physical substantiation of the game object may include a cavity, recess, cutout, or other volume to receive the machine-readable storage component.

In some embodiments, and as illustrated in FIG. 1, the game device communicates the information relating to the game object to the second server 143, with the second server coupled to the physical substantiation device. In some embodiments, the transmitted information relating to the game object defines a physical representation of the game object. In some embodiments, the transmitted information of the game object provides sufficient information to identify components of a physical representation of the game object. For example, if the game object is a game character, the transmitted information may be identification information that identifies visual and/or geometric aspects of different portions of the game character. In some embodiments, the identification information may be used to access information stored by the second server that defines the physical representation of the game object. In some embodiments, the identification information may be used by the second server to request information from another server, for example first server 136, which defines the physical representation of the game object.

Figure 2:
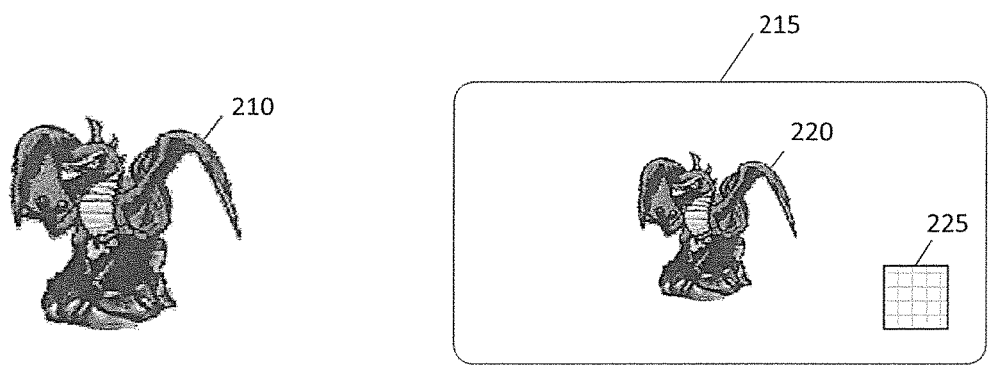
FIG. 2 illustrates two examples of a substantiation of a videogame character in accordance with aspects of the invention.

FIG. 2 illustrates an example physical substantiation of a game object in accordance with aspects of the invention. As illustrated in FIG. 2, the physical substantiation of a game object (in this example, a game character) may include a physical object or toy 210 and/or a card 215. The physical object or toy may resemble the game object and have visual attributes of the game object. In some embodiments, non-visual attributes may be reflected as well. For example, with respect to toy 210, the game object's non-visual attributes such as character class or element type may affect the color of toy 210's pedestal or base. In some embodiments the physical object or toy may be formed using a printer device, for example printer 147 of FIG. 1. In some embodiments the toy 210 may be, or include features, as discussed in U.S. patent application Ser. No. 13/335,737, filed Dec. 22, 2011, entitled "Interactive Video Game With Visual Lighting Effects" and/or U.S. patent application Ser. No. 13/359,361, filed Jan. 26, 2012, entitled "Interactive Video Game With Toys Having Special Effects," the disclosures of both of which are incorporated herein by reference for all purposes. As discussed herein, the physical object or toy may comprise a machine-readable/writable storage component storing information relating to the game object. The information stored in the machine-readable/writable storage component may be sensed, read, and/or written by a peripheral device, for example the peripheral device 105 and/or a game device, for example the game console 111 of FIG. 1, coupled directly or indirectly to the storage component. The machine-readable/writable information may include information of the visual and non-visual attributes of the game character.

Still referring to FIG. 2, the card 215 may include an image 220 and a storage component 225. In the example of FIG. 2, the image comprises an image of the videogame object and is printed on the card using the printer device. In some embodiments, the image may comprise information relating to the videogame object's non-visual attributes. The storage component can be used to store and/or reference information relating to the game object. In some embodiments the storage component is an RFID tag, however in various embodiments, other memory and/or identification devices may be used including, for example, magnetic stripes, NFC tags, Q codes, barcodes, or any other non-volatile memory. Although the storage component 225 is shown as visible on a front of the card in FIG. 2, it should be recognized that in various embodiments the storage component 225 may not be externally visible, with for example the storage component 225 being embedded within the card. It should also be recognized that in some embodiments the storage component 225 may be located at any location of the card that does not hinder functionality of the storage component or the card.

The physical substantiation of the game object (e.g., toy 210 and/or a card 215) may be linked to the game object by associating the information relating to the physical substantiation (e.g., a unique identifier of the physical substantiation) with information relating to the game object, and storing said association in the game device and/or a server. The stored information may, in some embodiments, be accessed across multiple platforms (e.g., different game consoles, game devices, and computer devices) and applications (e.g., videogames, companion apps, online stores, social media applications, websites, etc.).

Figure 3:
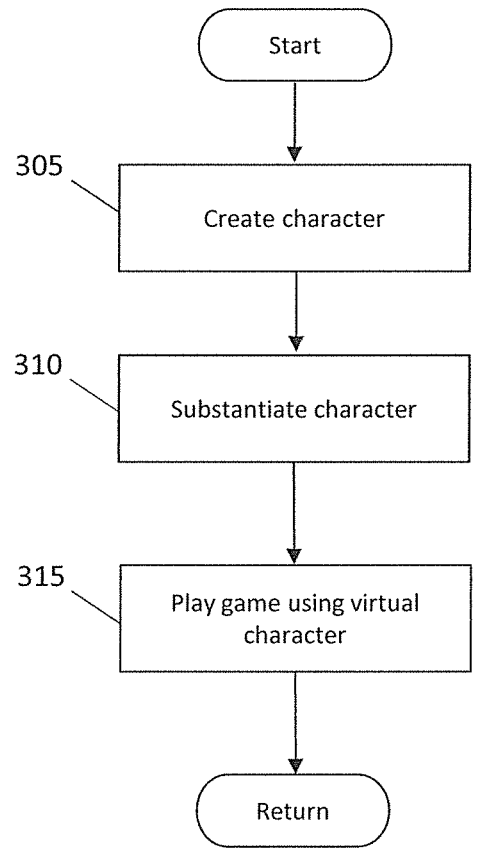
FIG. 3 is a flow diagram of a process in accordance with aspects of the invention.

FIG. 3 is a flowchart of a process in accordance with aspects of the invention. In some embodiments the process is performed by the system of FIG. 1. In some embodiments portions of the process are performed by, or with assistance of, a game player computer, a computer coupled to a physical substantiation device, a game object information server, and/or one or more processors of such computers or servers. In some embodiments the processors execute program instructions in performing the process.

In block 305 the process creates a videogame object. In some embodiments the process creates an object by presenting selectable options regarding attributes of a game object to a game player, and receives selections from those options input by the game player. In some embodiments the options are presented on a display of a game device. In some embodiments the selections are received by way of user inputs to the game device, for example by way of operation of a game controller.

In block 310 the process physically substantiates the created videogame object. The process may substantiate the created game object using a physical substantiation device as discussed above and throughout. Also as discussed above and throughout, the physical substantiation of the object may comprise one or more storage components storing information relating to the object and/or a unique identifier associated with the physical substantiation of the object.

In block 315 the process provides for game play of a videogame utilizing the created game object. In some embodiments, the process reads the information relating to the object from the physical substantiation's one or more storage components and uses the information to present the game object in the videogame. In some embodiments such is performed, for example, as discussed in U.S. patent application Ser. No. 13/109,956, filed May 17, 2011, entitled "Video Game With Concurrent Processing of Game-Related Objects," the disclosure of which is incorporated by reference for all purposes. Additionally or alternatively, the process reads the unique identifier associated with the physical substantiation of the object and uses it to retrieve information relating to the game object and present the object in the videogame. In some embodiments such is performed, for example, as discussed in U.S. patent application Ser. No. 13/461,508, filed May 1, 2012, entitled "Server Based Interactive Video Game With Toys," the disclosure of which is incorporated by reference for all purposes.

The process thereafter returns.

Figure 4:
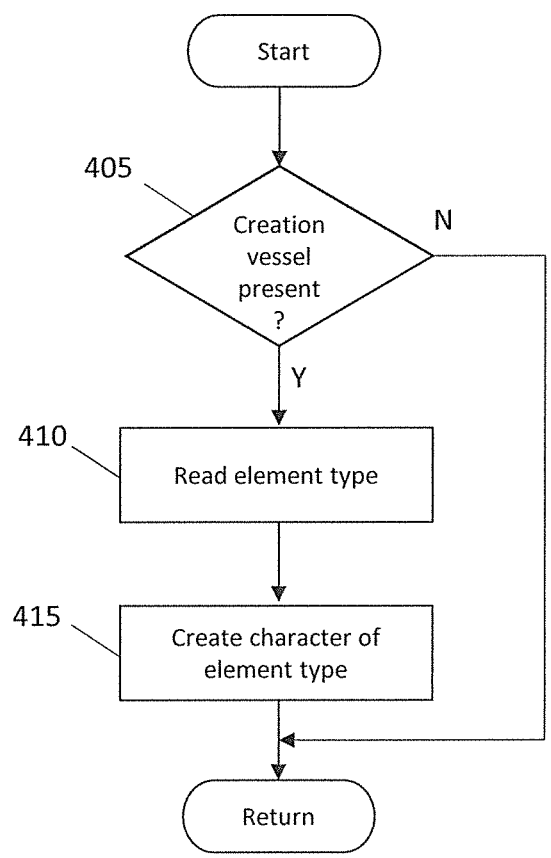
FIG. 4 is a flow diagram of a process of creating a videogame character in accordance with aspects of the invention.

FIG. 4 is a flow diagram of a process of creating a videogame object in accordance with aspects of the invention. The process may be performed by a game device, for example the game console 111 of FIG. 1, or a combination of devices. Additionally the process may be performed by a processor configured by program instructions. In some embodiments the process of FIG. 4 performs operations of block 305 of the process of FIG. 3.

In block 405, the process determines whether or not a creation vessel is present. As discussed above, the creation vessel may comprise a machine-readable/writeable storage component. In some embodiments the creation vessel is considered present if the process successfully communicates with the creation vessel's storage component using a suitable reader coupled to the game device or using the peripheral device, with the creation vessel for example being placed on a surface of the peripheral device. If the creation vessel is present, the process continues to block 410. Otherwise the process returns.

In block 410, the process reads an object type from the creation vessel. The object type, for example, may correspond to a particular class or set of game objects. In one non-limiting example, object type may be an element type of the game object, for example, magic, tech, earth, air, fire, water, life, light, dark, or undead. In another non-limiting example, the object type may be a character class of the game object, for example monk, thief, swordsman, wizard, dervish, etc. In some embodiments, the process may read from a particular memory location of the creation vessel's storage component for the object type using the reader or peripheral device.

In block 415, the process creates a game object based on the object type. For example, for a particular object type the process may present a game player with options for selection that correspond to game objects of that object type. The options, for example, may relate to visual attributes of game objects of the particular object type (e.g., a selection of armor, helmets, and shields for a knight character type, a selection of robes and costumes for a wizard character type, or a selection of racing stripes for a car vehicle type). The options may in addition also relate to capabilities and powers of the game objects of the particular object type (e.g., a selection of weapons and tools for a knight character type, a selection of magical spells for a wizard character type, a selection of mechanical attributes for a car vehicle type). Upon selection of the options, the process for example responsive to input of a user input device may generate or create a game object in accordance with the selected options.

The process thereafter returns.

Figure 5:
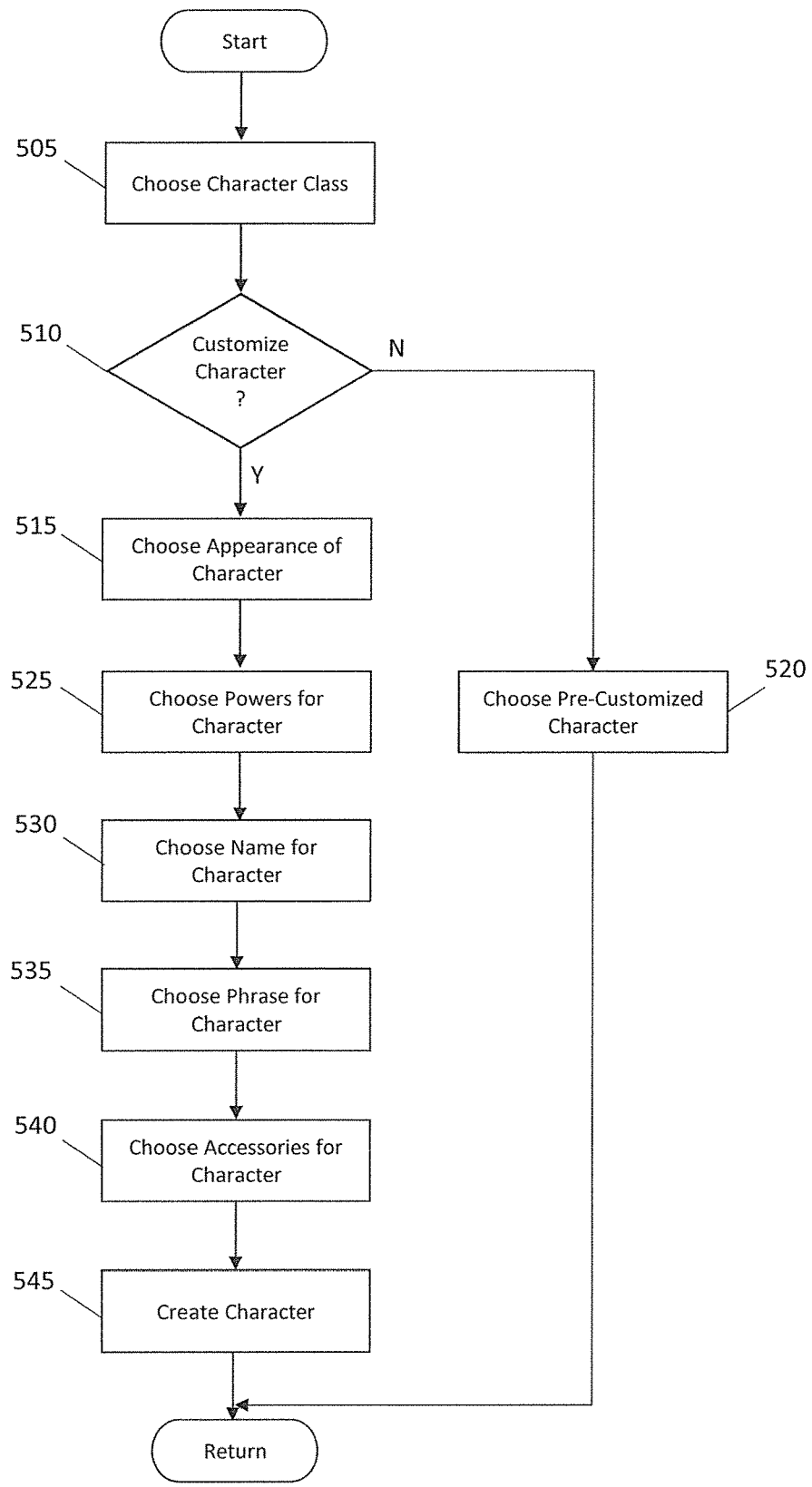
FIG. 5 is a further flow diagram of a process of creating a videogame character in accordance with aspects of the invention.

FIG. 5 is a further flow diagram of a process of creating a videogame object in accordance with aspects of the invention. In some embodiments the process may be performed as part of a process for creating a game object such as the process performed in block 305 of FIG. 3 and/or the process performed in block 415 of FIG. 4. In addition, the process may be performed by a game device, for example the game console 111 of FIG. 1, responsive to inputs from user input devices, for example the game controller 115 of FIG. 1, and the process may be performed by one or more processor configured by program instructions. In some embodiments the process of FIG. 5 performs operations of block 305 of the process of FIG. 3. In some embodiments the process of FIG. 5 performs operations of block 415 of the process of FIG. 4.

In block 505, the process receives a selection of an object class. In some embodiments the selection is provided by a user input device, operated by a game player, of the game device. In some embodiments, the object class may correspond to an element such as magic, tech, earth, air, fire, water, life, light, dark, or undead. Each game object may associate with at least one object class (e.g., at least one of the elements) which affects the object's abilities and/or powers in game play.

In block 510, the process determines whether game object customization is requested. If game object customization is requested, the process continues to block 515. Otherwise, the process continues to block 520, in which the process chooses a pre-customized game object. The pre-customized game object may possess features that include predefined visual attributes, powers, name, catch phrase, and accessories.

In block 515, the process receives selections of visual attributes for a game object. In some embodiments, for example where the game object is a character, the visual attributes may include a head, arms, legs, a torso, wings, a tail, scales, and/or colors of the game character. The head, arms, legs, torso, wings, tail, and scales may be of various shapes and sizes.

In block 520, the process chooses a pre-customized game object. The pre-customized game object possesses features that include predefined visual attributes, powers, name, catch phrase, and accessories.

In block 525, the process receives selections of powers for the game object. Powers in some embodiments may include primary and/or secondary powers. Primary powers, for example, may include shocking enemies with bolts of lightning or spinning using wings and a tail to damage enemies. Secondary power in some embodiments may include dashing in various directions in shadow form or digging underground to avoid attacks.

In block 530, the process receives a selection of a name for the game object. The name in general may be any combination of characters although the name may have a character length limit. In some embodiments, the name may comprise only alphabet letters although in other embodiments, the name may include alphanumeric characters and/or symbols. In some embodiments, rules and/or filters may be applied to prevent the use of foul or offensive language in the name-generation process.

In block 535, the process receives a selection of a catch phrase for the game object. As with the name, the catch phrase generally may be any combination of characters with a character length limit although the character length limit of the catch phrase is generally greater than that of the name. In some embodiments, the catch phrase comprises only alphabet letters although in other embodiments, as with the name, the catch phrase may include alphanumeric characters and symbols. In some embodiments, rules and/or filters may be applied to prevent the use of foul or offensive language in the catch phrase-generation process.

In block 540, the process receives selections of accessories for the game object. The game object for example may possess accessories as part of the videogame play. The accessories may include weapon, clothing items, hat, shield, armor, and shoes. In some embodiments the accessories may be considered to include ornamentation which may include jewelry and/or body art.

In block 545, the process creates the customized object. The process for example may generate a game object in accordance with the chosen or selected visual attributes, powers, name, catch phrase, and/or accessories.

The process thereafter returns.

Figure 6:
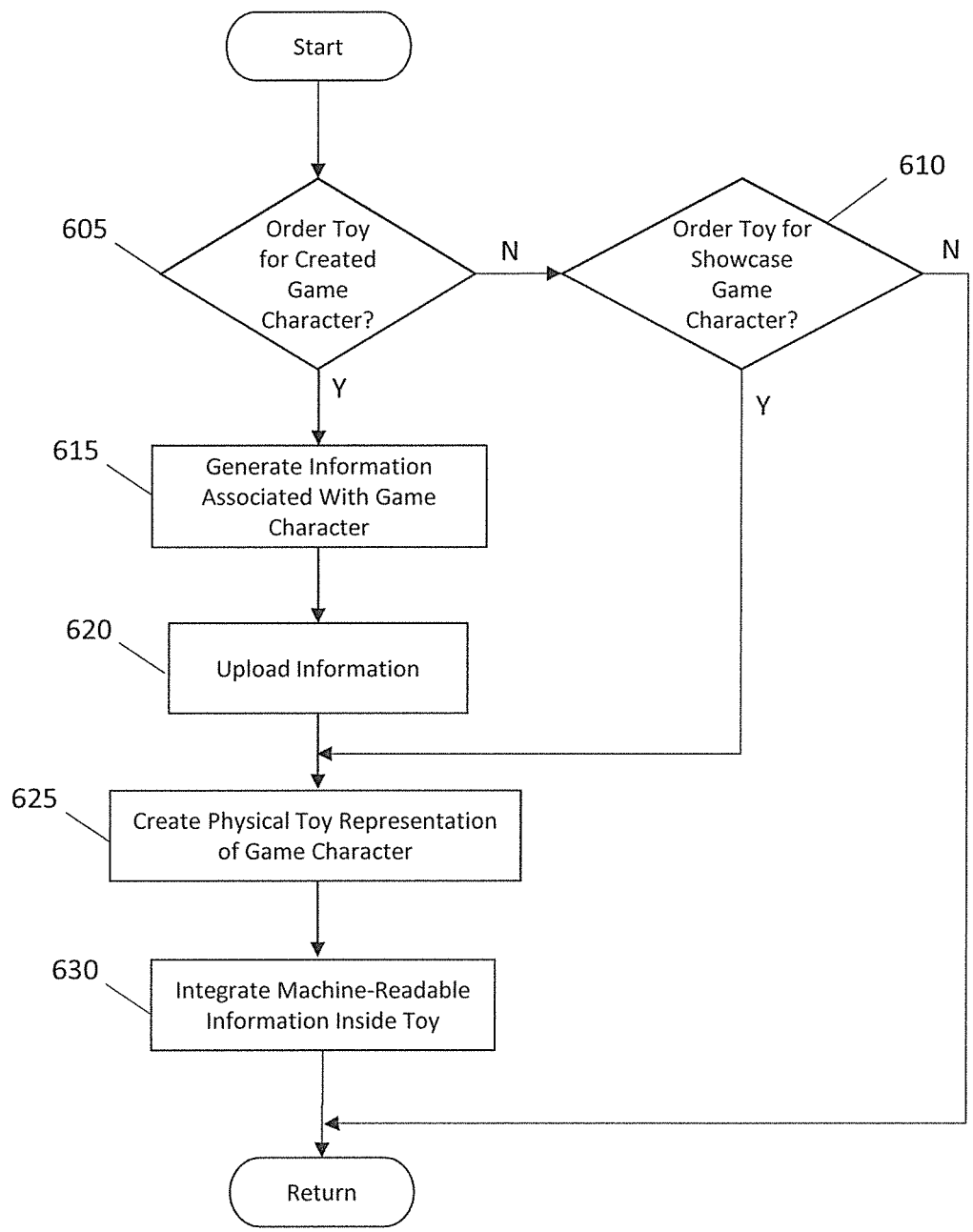
FIG. 6 is flow diagram of a process for creating a substantiation of the videogame character in accordance with aspects of the invention.

FIG. 6 is flow diagram of a process for creating a substantiation of the videogame object in accordance with aspects of the invention. In some embodiments the process may be performed as part of a process for substantiating a game object such as the process performed in block 310 of FIG. 3. In addition, the process may be performed by a combination of devices including a game device, for example the game console 111 of FIG. 1, having one or more processor and a printer device, for example the printer 147 of FIG. 1. In some embodiments the toy may be the toy 210 of FIG. 2. In some embodiments the process of FIG. 6 performs operations of block 310 of the process of FIG. 3.

In block 605, the process determines whether an order is placed for a toy based on a created game object, for example a toy corresponding to a customized or pre-customized game object. The process may determine that an order is placed based on inputs received from user input devices, for example the game controller 115 of FIG. 1. If an order for the toy is placed, the process continues to block 615. Otherwise, the process continues to block 610.

In block 610, the process determines whether an order is placed for a toy corresponding to a game character object in a virtual showcase or showroom. The game object may be a customized game object communicated or uploaded by a game player to a server, for example the server 136 of FIG. 1. The game object may be one of a plurality of curated customized game objects selected by an administrator or voted or ranked by game players. If an order for the toy is placed, the process continues to block 625. Otherwise, the process returns.

In block 615, the process generates data associated with the game object. Such data may include geometric data corresponding to shapes and sizes of the game object. In some embodiments, the geometric data may correspond to visual attributes of the game object including a head, arms, legs, a torso, wings, a tail, scales, doors, wheels, propellers, armor, weaponry, and other ornamentation (depending on whether the object is a character, vehicle, building, item, etc.). Additionally, the data may include colors of various parts of the game object.

In block 620, the process communicates or uploads the data associated with the game object, for example to server 136 of FIG. 1. Additionally or alternatively, the process may communicate such data to another server, for example the other server 143 of FIG. 1, which may be operated by a toy manufacturer or a third party vendor in a physical substantiation facility.

In block 625, the process creates a toy representation of the game object. The process in some embodiments may download the data associated with the game object from server 136 and/or other server 143 and convert the downloaded data to a compatible format, for example a compatible 3-D printing format such as .STL or .OBJ, for use in creating the toy. The converted data may be sent, for example, to the printer device for forming or printing the toy.

In block 630, the process integrates machine-readable information inside the toy. In some embodiments the process may integrate one or more storage components into or on the surface of the toy. The machine-readable information may be positioned at or about a center of the toy although any position that enables communication with a suitable reader would suffice.

The process thereafter returns.

Figure 7:
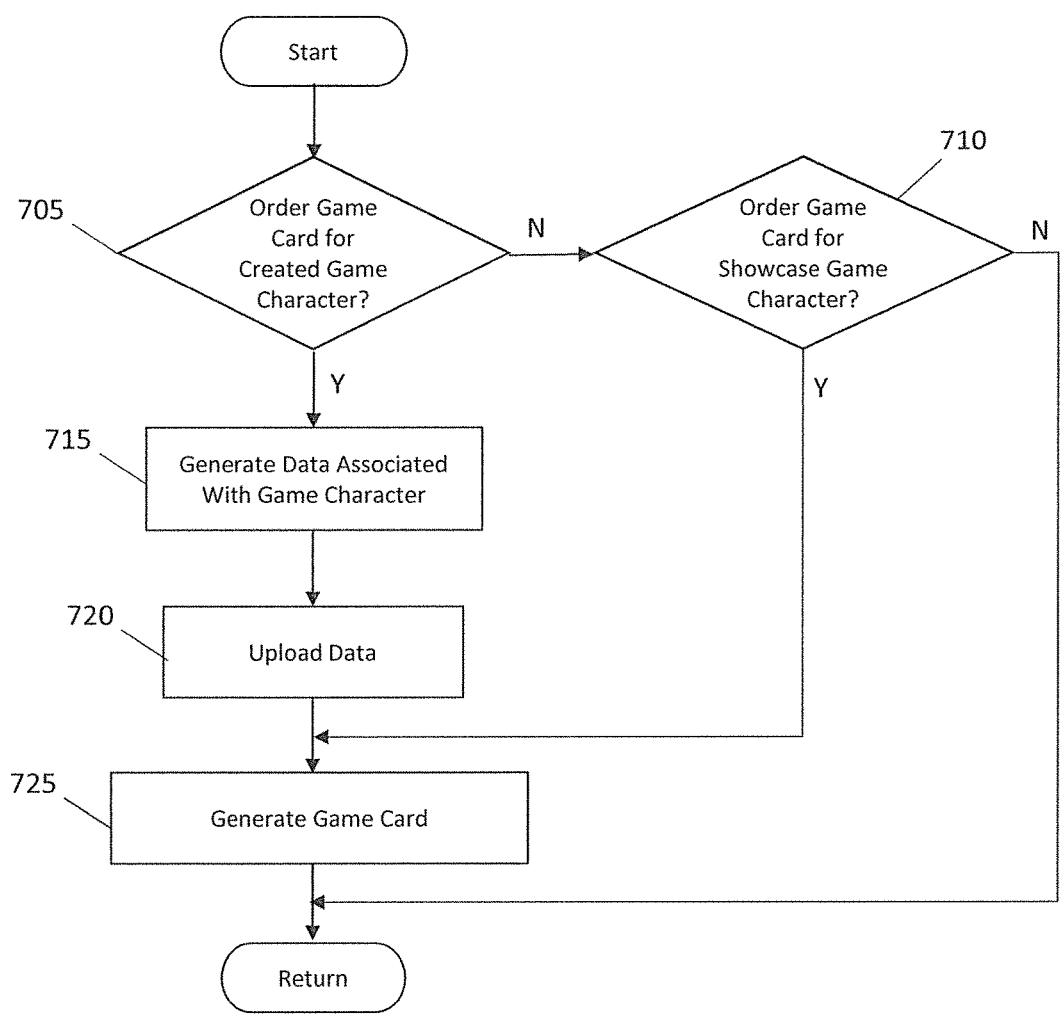
FIG. 7 is flow diagram of a further process for creating a substantiation of the videogame character in accordance with aspects of the invention.

FIG. 7 is flow diagram of a further process for creating a substantiation of the videogame object in accordance with aspects of the invention. The process may be performed as part of a process for substantiating a game object, for example the process performed in block 310 of FIG. 3. In addition, the process may be performed by a combination of devices including a game device, for example the game console 111 of FIG. 1, having one or more processor. In some embodiments the card may be the card 215 of FIG. 2. In some embodiments the process of FIG. 7 performs operations of block 310 of the process of FIG. 3.

In block 705, the process determines whether an order is placed for a card based on a created game object, for example a card including data of a customized or pre-customized game object. The process may determine that an order is placed based on inputs received from user input devices, for example the game controller 115 of FIG. 1. If an order for the card is placed, the process continues to block 715. Otherwise, the process continues to block 710.

In block 710, the process determines whether an order is placed for a card including data of a game object provided by a virtual store or showroom. The game object may be a customized game character communicated or uploaded by a game player to a server, for example the server 136 of FIG. 1. The game object may be one of a plurality of curated customized game objects selected by an administrator or voted or ranked by game players. If an order for the card is placed, the process continues to block 725. Otherwise, the process returns.

In block 715, the process generates data associated with the game object. The data may include geometric information corresponding to shapes and sizes of the game object. In some embodiments, the geometric data may correspond to visual attributes of the game object including a head, arms, legs, a torso, wings, a tail, scales, doors, wheels, propellers, armor, weaponry, and other ornamentation (depending on whether the object is a character, vehicle, building, item, etc.). Additionally, the data may include colors of various parts of the game object.

In block 720, the process communicates or uploads the data associated with the game object, for example to server 136 of FIG. 1. Additionally or alternatively, the process may communicate or upload the data to another server, for example the other server 143 of FIG. 1. In some embodiments, the other server may be operated by a toy manufacturer or a third party vendor in a 3-D printing facility.

In block 725, the process generates a card including the data of the game object. The process in some embodiments may download the data associated with the game object (e.g., from server 136 and/or other server 143) and convert the downloaded data to a compatible format for storing in the card's machine-readable/writeable storage component. In some embodiments, the card may comprise a unique identifier, and the process may associate the card's unique identifier with the data of the game object. The card may be of any desired shape and/or size and may be, for example, a trading card, a greeting card, a gift card, a poster, etc. In some embodiments, the card is generated using a printer device, for example the printer 147 of FIG. 1.

The process thereafter returns.

Figure 8:
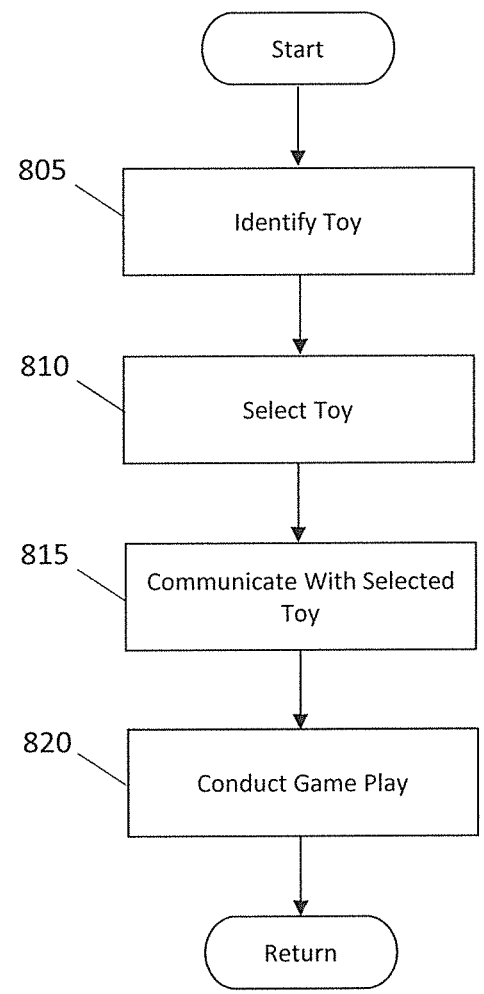
FIG. 8 is a flow diagram of a process for providing for game play using a substantiation of a videogame character in accordance with aspects of the invention.

FIG. 8 is a flow diagram of a process for providing for game play using a substantiation of a videogame object in accordance with aspects of the invention. The process may be implemented by a game peripheral, for example the game peripheral 105 of FIG. 1, a game device, for example the game console 111 of FIG. 1, or a combination of devices. Additionally, the process may be implemented using a processor configured by program instructions. The process, in part, may be performed utilizing a standardized protocol, for example, the ISO/IEC 14443 standard for Identification Cards. Accordingly, the process may communicate with toys via radio-frequency communication. In some embodiments the process of FIG. 8 performs operations of block 315 of the process of FIG. 3.

In block 805, the process identifies toys in one or more defined regions. For example, the process may determine what toys are one or more surfaces or areas of the game peripheral. In various embodiments, the toys may be identified by RFID, NFC, barcodes, or optical recognition. In one embodiment, identification of toys includes a videogame peripheral reading identifiers of the toys and supplying the identifiers to a game device.

In block 810, the process selects a toy, for example the toy 210 of FIG. 2, for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a videogame associated with the process that the selected toy is not available.

In block 815, the process communicates with the selected toy. For example, the process may read from a particular memory location of the toy or may write to a particular memory location of the toy. In many embodiments, the process expects to receive an acknowledgment or response from the toy, for example a selection acknowledge (SAK), and when not received, the process may retransmit the command or may signal the videogame associated with the process that the selected toy is not available.

In block 820 the process conducts game play. For example, a processor of the game device, in response to inputs from user input devices, for example the game controller 115 of FIG. 1, and the videogame peripheral, may command display on a display device of a game object represented by and resembling the selected toy by adding such game object to a virtual world, with the game object able to move about the virtual world. For example, the processor may include the game object based on inputs from the videogame peripheral, and the processor may control actions and activities of the game object based on the inputs from the user input devices.

The process thereafter returns.

Figure 9:
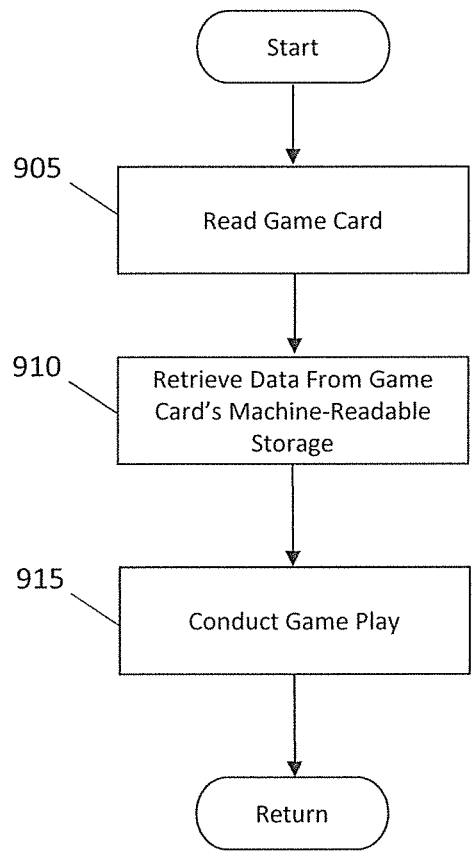
FIG. 9 is a flow diagram of a further process for providing for game play using a substantiation of a videogame character in accordance with aspects of the invention.

FIG. 9 is a flow diagram of a further process for providing for game play using a substantiation of a videogame object in accordance with aspects of the invention. The process may be implemented by a reader, a user device, or a combination of devices. Additionally, the process may be performed by a processor configured by program instructions. In some embodiments, the process of FIG. 9 performs operations of block 315 of the process of FIG. 3.

In block 905, the process reads a card, for example the card 215 of FIG. 2. For example, a user device may read, detect, sense, or otherwise communicate with the card's machine-readable storage using a suitable reader such as a magnetic stripe reader, barcode reader, RFID reader, NFC reader, Q code reader, camera, etc. In some embodiments, the reader may be an external peripheral reader connected to the user device (either wirelessly or through a wire). Alternatively or additionally, the reader may be integrated into the user device.

In block 910, the process retrieves data on the card's machine-readable storage, for example a magnetic stripe, a RFID tag, an NFC tag, Q codes, barcodes, or any non-volatile memory. The data may include information relating to the game object or a unique identifier of the card associated with information relating to the game object.

In block 915, the process conducts game play. For example, a processor of the user device, in response to inputs from user input devices, and the reader, may command display on a display device, which may be coupled to the user device, of a game object corresponding to the data retrieved from the card by adding such game object to a virtual world, with the game character able to move about the virtual world. For example, the processor may include the game object based on inputs from the reader (or from the game device and/or server based on the card's unique identifier), and the processor may control actions and activities of the game object based on the inputs from the user input device.

The process thereafter returns.

Figure 10:
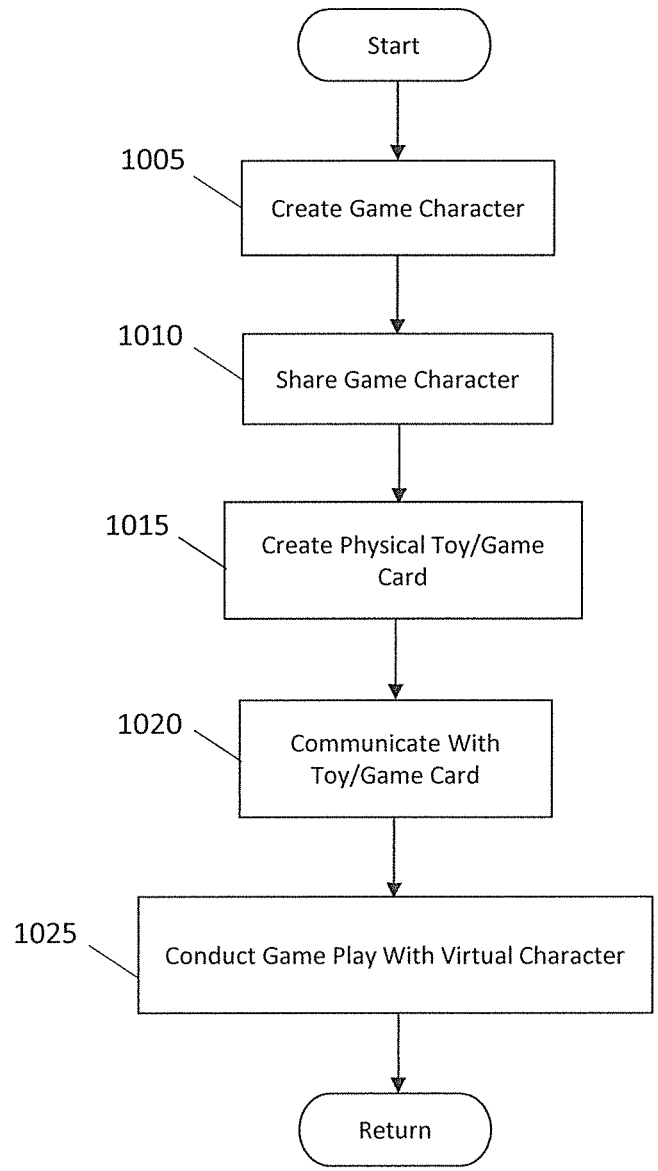
FIG. 10 is a flow diagram of a further process in accordance with aspects of the invention.

FIG. 10 is a flow diagram of a further process in accordance with aspects of the invention. The process may be implemented by a combination of devices including a peripheral device (e.g., the peripheral device 105 of FIG. 1), a reader, a game device (e.g., the game console 111 of FIG. 1), and/or a printer device (e.g., the printer 147 of FIG. 1). In addition, the process may be performed using at least one processor configured by program instructions.

In block 1005, the process creates a game object. The process, for example based on inputs from user input devices (e.g., the game controller 115 of FIG. 1) may perform customization of a game object when a game player chooses to customize his personal game character. In some embodiments, the game player may instead choose a pre-customized game object from a list of pre-customized game object. The customization of a game object, in many embodiments, may include choosing a class of objects, and selecting visual and non-visual attributes for the game object. While the game player creates or customizes the game object, the process may display the game object to the game player and reflect any modifications in real time. In some embodiments, the process may animate the game object in response to the game player's selections. For example, in the case where the game object is a virtual character, the process may animate the virtual character's body parts in response to the game player's selection and modification of those body parts.

In block 1010, the process shares the created game object. In some embodiments, the process may communicate or upload the created game object to a server, for example the server 136 of FIG. 1, for displaying, for example in a virtual showcase or showroom, when the game player chooses to share the created game object with online game players. In some embodiments, however the game player may choose not to share the created game object. In some embodiments, the online game players may vote on and/or rate the custom game objects in a variety of categories (e.g., most/least favorite, funny, creative, entertaining, cool, etc.).

In block 1015, the process creates a physical substantiation of the game object. In some embodiments, the physical substantiation may be associated with the game object customized by the game player. In some embodiments, the physical substantiation may be associated with the pre-customized game object. In some embodiments, the physical substantiation may be associated with a game object provided by the server (e.g., a game object displayed in the virtual showcase). The physical substantiation may be created or formed by a physical substantiation device coupled directly to the game device, a physical substantiation device of the videogame manufacturer (or distributor or publisher), and/or a third-party manufacturer or vendor.

In block 1020, the process communicates with the physical substantiation. Communication with the physical substantiation may be performed by the peripheral device having, for example, one or more substantially flat upper surfaces/regions for placement of toys thereon. The game player generally places the physical substantiation atop one of the flat surfaces/regions of the peripheral device during game play. Each physical substantiation generally includes machine-readable information. When the physical substantiation is read by the peripheral device, the peripheral device may retrieve communication information from the physical substantiation or may write communication information to the physical substantiation. In some embodiments, the game device performs the functions of the peripheral device.

In block 1025, the process conducts game play with the virtual object corresponding to the created game object. For example, a processor of the game device, in response to inputs from the user input devices and the peripheral device, may command display on a display device of a game object corresponding to the physical substantiation by adding such game object to a virtual world. For example, the processor may include the game object based on inputs from the peripheral device, and the processor may control actions and activities of the game object based on the inputs from the user input devices. In some embodiments, instead of conducting game play with the virtual character corresponding to the physical substantiation, the process conducts game play with the virtual character corresponding to the pre-customized game character.

The process thereafter returns.

Although the invention has been discussed with respect to various embodiments, it should be recognized that the invention comprises the novel and non-obvious claims supported by this disclosure.

What is claimed is:

1. A method for creating and using a physical representation of a videogame character, comprising:
   receiving information relating to a videogame character, the information including selections of physical attributes of different parts of the videogame character, ornamentation of the videogame character, and character capabilities of the videogame character from a game device;
   substantiating the videogame character in a physical object in the form of a three-dimensional toy;
   storing information relating to the videogame character in a machine readable/writeable storage component of the physical object;
   and
   providing for videogame play which includes reading the information relating to the videogame character from the machine readable/writeable storage component of the physical object, using the information relating to the videogame character to present the videogame character in the videogame, and providing game player control of the videogame character in the videogame.

2. The method of claim 1, wherein substantiating the videogame character in the three dimensional toy comprises printing the three dimensional toy by a 3-D printer.

3. The method of claim 2, wherein the information relating to the videogame character is received by a first computer.

4. The method of claim 3, wherein the information relating to the videogame character defines a visual appearance of the videogame character.

5. The method of claim 3, wherein the information relating to the videogame character is identification information which identifies various parts of the videogame character; and wherein substantiating the videogame character further comprises:

transmitting over the network, by the first computer, the identification information to a second computer.

6. The method of claim 1, further comprising receiving selections of the videogame character capabilities from the game device.

7. The method of claim 6, wherein the machine readable/writeable storage component comprises an RFID chip.

\* \* \* \* \*